US008047961B2

(12) United States Patent
Jess et al.

(10) Patent No.: US 8,047,961 B2
(45) Date of Patent: Nov. 1, 2011

(54) FAST EXIT MODE ENGINE TORQUE CONTROL SYSTEMS AND METHODS

(75) Inventors: Richard B. Jess, Haslett, MI (US); Bahram Younessi, Farmington, MI (US); Michael L. Kociba, Hartland, MI (US); Joseph M. Stempnik, Warren, MI (US); Andrew W. Baur, Waterford, MI (US)

(73) Assignee: GM Global Technology Operations LLC

( * ) Notice: Subject to any disclaimer, the term of this patent is extended or adjusted under 35 U.S.C. 154(b) by 494 days.

(21) Appl. No.: 12/364,027

(22) Filed: Feb. 2, 2009

(65) Prior Publication Data

US 2009/0227420 A1 Sep. 10, 2009

Related U.S. Application Data

(60) Provisional application No. 61/034,624, filed on Mar. 7, 2008.

(51) Int. Cl.
*F16H 59/74* (2006.01)
*F02P 5/00* (2006.01)

(52) U.S. Cl. .................................. 477/101; 123/406.23

(58) Field of Classification Search .................. 477/101, 477/111; 123/198 F, 406.23, 681
See application file for complete search history.

(56) References Cited

U.S. PATENT DOCUMENTS

2009/0270225 A1* 10/2009 Whitney et al. ............... 477/115
2010/0075803 A1* 3/2010 Sharples et al. .............. 477/110

* cited by examiner

*Primary Examiner* — Dirk Wright

(57) ABSTRACT

An engine control system of a vehicle comprises a first module and a cylinder deactivation module. The first module selectively adjusts torque output by an engine based on a vehicle torque request that is greater than a driver torque request. The cylinder deactivation module selectively deactivates a cylinder of the engine when a difference between an estimated maximum torque output of the engine and the driver torque request is greater than a predetermined maximum torque.

26 Claims, 4 Drawing Sheets

FAST EXIT MODE ENGINE TORQUE CONTROL SYSTEMS AND METHODS

CROSS-REFERENCE TO RELATED APPLICATIONS

This application claims the benefit of U.S. Provisional Application No. 61/034,624, filed on Mar. 7, 2008. The disclosure of the above application is incorporated herein by reference in its entirety.

FIELD

The present disclosure relates to internal combustion engines and more particularly to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate at which fuel is injected to provide a desired air/fuel mixture to the cylinders. Increasing the air and fuel to the cylinders increases the torque output of the engine.

Engine control systems have been developed to control engine torque output to achieve a desired torque. Other vehicle systems, such as a chassis control system, may request that the engine produce torque in excess of torque requested by a driver of the vehicle. For example, the excess torque may be used to eliminate dragging of a wheel of the vehicle, increase vehicle traction, increase vehicle stability, smooth a gear shift, and/or for any other suitable purpose.

SUMMARY

An engine control system of a vehicle comprises an immediate torque control module and a fast exit mode module. The immediate torque control module selectively adjusts torque output by an engine based on a vehicle torque request that is greater than a driver torque request. The fast exit mode module selectively deactivates a cylinder of said engine when a difference between an estimated maximum torque output of said engine and said driver torque request is greater than a predetermined maximum torque.

In other features, the engine control system further comprises a requesting module that selectively generates said vehicle torque request. The fast exit mode module deactivates said cylinder when said requesting module aborts said vehicle torque request while said estimated maximum torque output is greater than said driver torque request.

In still other features, the engine control system further comprises a requesting module that selectively generates said vehicle torque request when a predetermined event occurs. The fast exit mode module deactivates said cylinder when said predetermined event stops occurring while said estimated maximum torque output is greater than said driver torque request.

In further features, the predetermined event is wheel drag.

In still further features, the fast exit mode module deactivates said cylinder when a fault is diagnosed in at least one of a sensor and a module of said vehicle while said estimated maximum torque output is greater than said driver torque request.

In other features, the engine control system further comprises a requesting module that operates in one of a first mode of operation and a predetermined mode of operation. The fast exit mode module deactivates said cylinder when said requesting module enters said predetermined mode of operation while said estimated maximum torque output is greater than said driver torque request.

In still other features, the predetermined mode of operation is a manual shift mode.

In further features, the fast exit mode module deactivates said cylinder when said vehicle torque request is limited while said estimated maximum torque output is greater than said driver torque request.

In still further features, the fast exit mode module outputs a fast exit torque request when said difference is greater than said predetermined maximum torque. The immediate torque control module deactivates said cylinder when said fast exit torque request is output.

In other features, the immediate torque control module disables at least one of spark and fuel to said cylinder when said fast exit torque request is output.

In still other features, the immediate torque control module determines a number of cylinders for deactivation based on said driver torque request when said fast exit torque request is output and deactivates said number of cylinders.

In further features, the immediate torque control module limits said torque output of said engine based on said driver torque request.

In still further features, the engine control system further comprises a disabling module that disables said fast exit mode module when said difference between said estimated maximum torque output and said driver torque request is less than a predetermined minimum torque.

An engine control method comprises selectively adjusting torque output by an engine based on a vehicle torque request that is greater than a driver torque request and selectively deactivating a cylinder of the engine when a difference between an estimated maximum torque output of the engine and the driver torque request is greater than a predetermined maximum torque.

In other features, the engine control method further comprises deactivating the cylinder when a requesting module aborts the vehicle torque request while the estimated maximum torque output is greater than the driver torque request.

In still other features, the engine control method further comprises selectively generating the vehicle torque request when a predetermined event occurs and deactivating the cylinder when the predetermined event stops occurring while the estimated maximum torque output is greater than the driver torque request.

In further features, the predetermined event is wheel drag.

In other features, the engine control method further comprises deactivating the cylinder when a fault is diagnosed in at least one of a sensor and a module of the vehicle while the estimated maximum torque output is greater than the driver torque request.

In still other features, the engine control method further comprises deactivating the cylinder when a requesting module enters a predetermined mode of operation from a first mode of operation while the estimated maximum torque output is greater than the driver torque request.

In further features, the predetermined mode of operation is a manual shift mode.

In other features, the engine control method further comprises deactivating the cylinder when the vehicle torque request is limited while the estimated maximum torque output is greater than the driver torque request.

In still other features, the engine control method further comprises outputting a fast exit torque request when the difference is greater than the predetermined maximum torque and deactivating the cylinder when the fast exit torque request is output.

In further features, the engine control method further comprises disabling at least one of spark and fuel to the cylinder when the fast exit torque request is output.

In still further features, the engine control method further comprises determining a number of cylinders for deactivation based on the driver torque request when the fast exit torque request is output and deactivating the number of cylinders.

In other features, the engine control method further comprises limiting the torque output of the engine based on the driver torque request.

In still other features, the engine control method further comprises disabling the deactivating the cylinder when the difference between the estimated maximum torque output and the driver torque request is less than a predetermined minimum torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
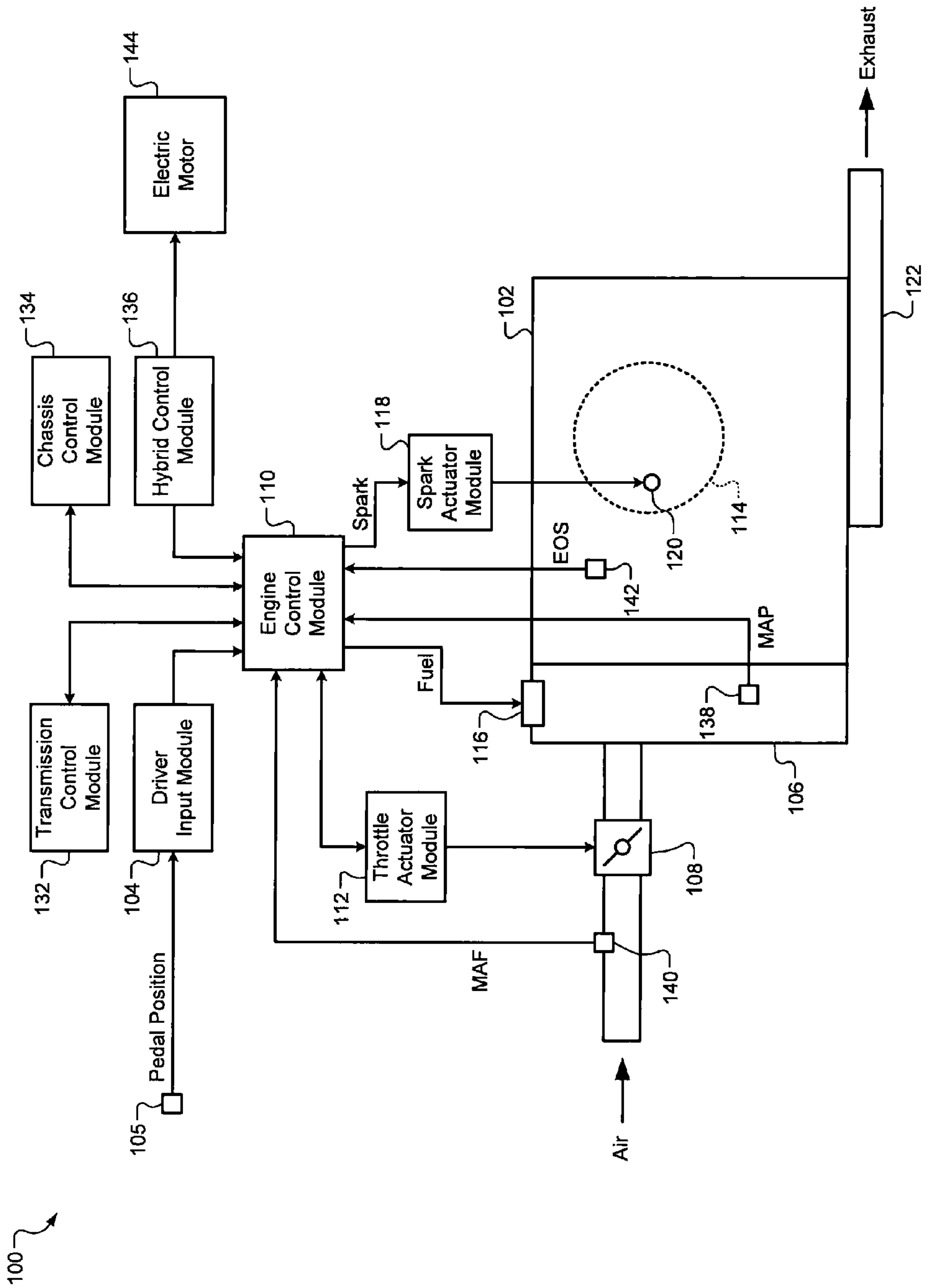
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller controls torque output by an engine based on torque requested by a driver of a vehicle (i.e., a driver torque request). In some circumstances, the engine controller may adjust the torque output of the engine to greater than the driver torque request. For example, the engine controller may increase the torque output of the engine when a vehicle torque request is generated that is greater than the driver torque request. The vehicle torque request may be generated to, for example, increase the torque output of the engine and eliminate wheel drag.

One or more events may occur while the torque output capability of the engine is increased, however, which may cause the driver to experience a "push" or an unexpected increase in engine speed. An event that may cause a push occurs when, for example, the vehicle torque request is aborted, exited, and/or lost.

Other events which may cause a push occur, for example, when a fault has been diagnosed in a sensor or module of the vehicle and/or when the module or system making the vehicle torque request enters a predetermined state of operation. The engine controller of the present disclosure selectively deactivates one or more cylinders when one or more of the events occurs. Deactivation of the cylinders adjusts the torque output of the engine 102 to the driver torque request and mitigates or eliminates the push that the driver may otherwise experience.

Referring now to FIG. 1, a functional block diagram of an engine system 100 is presented. The engine system 100 includes an engine 102 that combusts an air/fuel mixture to produce drive torque for a vehicle based on driver inputs provided by a driver input module 104. The driver input module 104 receives the driver's inputs from, for example, a pedal position sensor 105 that monitors position of an accelerator pedal (not shown) and generates a pedal position signal accordingly.

Air is drawn into an intake manifold 106 through a throttle valve 108. An engine control module (ECM) 110 commands a throttle actuator module 112 to regulate opening of the throttle valve 108 to control the amount of air drawn into the intake manifold 106. Air from the intake manifold 106 is drawn into cylinders of the engine 102. While the engine 102 may include multiple cylinders, for illustration purposes only, a single representative cylinder 114 is shown. For example only, the engine 102 may include 2, 3, 4, 5, 6, 8, 10, and/or 12 cylinders.

The air mixes with fuel provided by a fuel actuator 116 (e.g., a fuel injector) to form the air/fuel mixture, which is combusted within the cylinders. The ECM 110 controls the amount of fuel injected by the fuel actuator 116. The fuel actuator 116 may inject fuel into the intake manifold 106 at a central location or at multiple locations, such as near the intake valve of each of the cylinders. While the fuel actuator 116 is shown as injecting fuel into the intake manifold 106, the fuel actuator 116 may inject fuel at any suitable location, such as directly into the cylinder 114. For example only, one fuel actuator may be provided for each of the cylinders.

A piston (not shown) within the cylinder 114 compresses the air/fuel mixture. Based upon a signal from the ECM 110, a spark actuator module 118 energizes a spark plug 120 that is associated with the cylinder 114, which ignites the air/fuel mixture. The timing of the spark may be specified relative to the time at which the piston is at its topmost position, referred to as to top dead center (TDC), the point at which the air/fuel mixture is most compressed. In other engine systems, such as a compression combustion type engine (e.g., a diesel engine system) or a hybrid engine system, combustion may be initiated without the spark plug 120.

The combustion of the air/fuel mixture drives the piston down, thereby rotatably driving crankshaft (not shown). The piston then begins moving up again and expels the byproducts of combustion from the cylinder 114. The byproducts of combustion are ultimately exhausted from the vehicle via an exhaust system 122.

To abstractly refer to the various control mechanisms of the engine 102, each system that varies an engine parameter may be referred to as an actuator. For example, the throttle actuator module 112 controls the opening area of the throttle valve 108. The throttle actuator module 112 is therefore referred to as an actuator, and the opening area of the throttle valve 108 is referred to as an actuator position.

Similarly, the spark actuator module 118 can be referred to as an actuator, while the corresponding actuator position may refer to the timing of the spark (i.e., a spark timing). Another actuator may include, for example, the fuel actuator 116. The term actuator position with respect to the fuel actuator 116 may refer to the amount of fuel injected and/or the timing of the injection of fuel.

The ECM 110 adjusts actuator positions to provide a desired torque output by the engine 102. Torque is output by the engine 102 to a transmission (not shown). The transmission selectively transfers torque to one or more wheels of the vehicle to propel the vehicle.

The ECM 110 may determine a desired torque output based on torque requested by the driver of the vehicle (i.e., a driver torque request). A transmission control module 132, a chassis control module 134, and/or a hybrid control module 136 may also make torque requests. These torque requests are referred to as a transmission torque request, a chassis torque request, and a hybrid engine torque request, respectively. Other modules may also make torque requests. Torque requests other than the driver torque request are collectively referred to as vehicle torque requests.

The transmission control module 132 may generate a transmission torque request, for example, to generate a desired engine speed during gear shifts in the transmission. The chassis control module 134 may generate a chassis torque request to, for example, increase vehicle traction (i.e., decrease wheel slipping), eliminate wheel drag, and/or provide vehicle stability. The hybrid control module 136 may generate a hybrid torque request to, for example, coordinate operation of the engine 102 with an electric motor 144. In various implementations, the ECM 110, the transmission control module 132, the chassis control module 134, and/or the hybrid control module 136 may be integrated into one or more modules.

The ECM 110 may also adjust actuator positions based on various engine parameters measured throughout the engine system 100. For example only, the ECM 110 may adjust actuator positions based on a manifold absolute pressure (MAP) and/or a mass air flowrate (MAF). The MAP is provided by a manifold absolute pressure (MAP) sensor 138, which measures pressure within the intake manifold 106. In various implementations, engine vacuum may be measured, where engine vacuum is the difference between ambient air pressure and the pressure within the intake manifold 106.

The MAF is provided by a MAF sensor 140, which measures mass flowrate of air into the engine 102. While the MAF sensor 140 is shown as being located upstream of the throttle valve 108, the MAF sensor 140 may be located in any suitable location, such as in a common packaging with the throttle valve 108. The ECM 110 may also monitor other parameters, such as the output speed of the engine 102 in revolutions per minute (rpm). An engine speed sensor 142 measures the engine speed.

Figure 2:
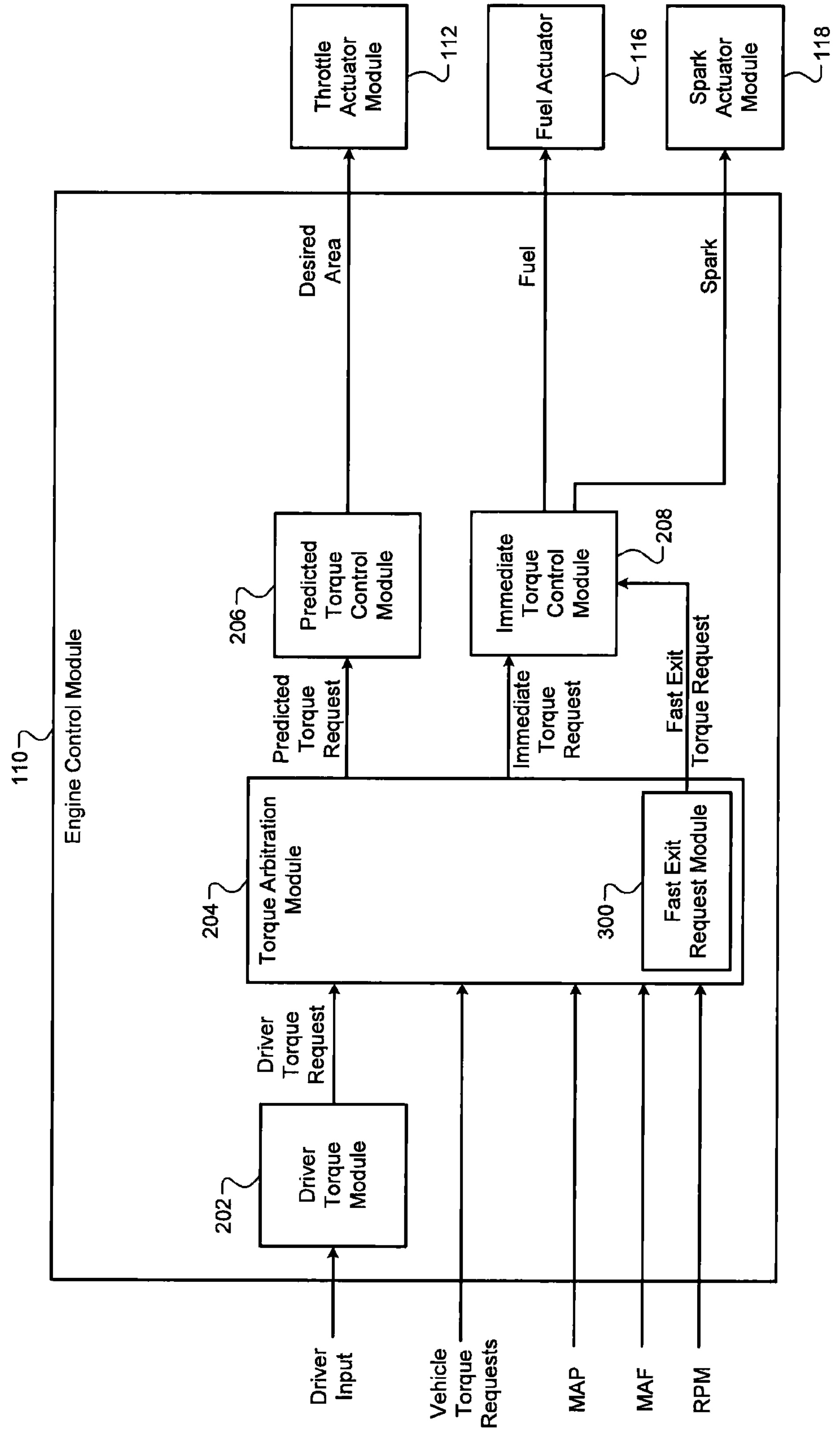
FIG. 2 is a functional block diagram of an engine control module according to the principles of the present disclosure.

Referring now to FIG. 2, a functional block diagram of an exemplary implementation of the ECM 110 is presented. The ECM 110 includes a driver torque module 202, a torque arbitration module 204, a predicted torque control module 206, and an immediate torque control module 208. The driver torque module 202 generates a driver torque request based on a driver input provided by the driver input module 104. For example, the driver torque request may be based on the position of the accelerator pedal.

The torque arbitration module 204 arbitrates between the driver torque request and vehicle torque requests, such as a transmission torque request, a chassis torque request, and/or a hybrid torque request. The torque arbitration module 204 determines a predicted torque request and an immediate torque request based on the received torque requests. More specifically, the torque arbitration module 204 determines how best to achieve the received torque requests and generates the predicted and immediate torque requests accordingly.

The predicted torque request is the amount of torque that will be required in the future to meet the torque requests. The immediate torque request is the amount of torque required at the present moment to meet temporary torque requests. The immediate torque request may be achieved by adjusting engine actuators that respond quickly, while slower engine actuators are targeted to achieve the predicted torque. For example only, the timing of the spark provided by the spark plug 120 and the amount of fuel injected by the fuel actuator 116 may be adjusted in a short period of time. The opening of the throttle valve 108, however, may require a longer period of time to be adjusted. Accordingly, the amount of fuel injected and/or the spark timing may be adjusted based on the immediate torque request, while the throttle valve 108 may be adjusted based on the predicted torque request.

The torque arbitration module 204 outputs the predicted torque request to the predicted torque control module 206 and the immediate torque request to the immediate torque control module 208. The predicted torque control module 206 determines desired actuator positions for slow actuators based on the predicted torque request. One of the slow actuators may include, for example, the throttle actuator module 112. The predicted torque control module 206 may determine the desired actuator positions to create a desired manifold absolute pressure (MAP), desired throttle area, and/or desired air per cylinder (APC) based on the predicted torque request.

The slow actuators then actuate based on the desired actuator positions. For example, the predicted torque control module 206 generates a desired area signal, which is output to the throttle actuator module 112. The throttle actuator module 112 then regulates the opening of the throttle valve 108 to produce the desired throttle area.

The immediate torque control module 208 determines desired actuator positions for fast actuators based on the immediate torque request. The fast actuators may include, for example, the spark actuator module 118 and/or the fuel actuator 116. For example only, the immediate torque control module 208 may command the spark actuator module 118 to adjust the spark timing to a calibrated timing, such as a minimum best torque (MBT) timing. The MBT timing may refer to the minimum spark advance possible (relative to a predetermined timing) at which a maximum amount of torque may be produced. The fast actuators actuate based on these desired actuator positions.

The immediate torque control module 208 may also selectively instruct deactivation of one or more cylinders of the engine 102. To deactivate the cylinder 114, the immediate torque control module 208 may, for example, eliminate provision of spark and/or fuel to the cylinder 114. In diesel engine systems, the immediate torque control module 208 may eliminate fuel to a cylinder to deactivate that cylinder.

In some circumstances, a vehicle torque request may be to increase torque production of the engine 102 above the driver torque request. For example, the transmission control module 132 may request torque output of the engine 102 to be increased to execute a gear shift. For example only, to execute a fourth-to-third gear shift when the engi is approximately 1000.0 rpm, the transmission control module 132 may request torque sufficient to increase the engine speed to 2000.0 rpm. This increase in engine speed may be to, for example, synchronize the engine speed with the input speed of the transmission when the oncoming gear (e.g., the third gear) is engaged.

In some circumstances, however, such a request to increase torque production above the driver torque request may be exited, aborted, or lost. For example, a change in conditions may cause the gear shift to be abandoned, causing the torque request to be exited. The driver may also command a defaulted state of operation which may cause the torque request to be aborted. As the torque output of the engine 102 is increased to meet the torque request, a "push" (i.e., an increase in engine speed) may be experienced. While the example of a torque request for a gear shift is provided, the present disclosure is applicable to other types of torque requests which request torque production of the engine 102 to exceed the driver torque request.

The torque arbitration module 204 includes a fast exit request module 300 that is enabled when a vehicle torque request causes torque production of the engine 102 to exceed than the driver torque request. The fast exit request module 300 monitors the vehicle torque request and deactivates one or more cylinders of the engine 102 when the vehicle torque request is exited, aborted, or lost. The fast exit request module 300 also deactivates cylinders when a fault or error has occurred, or when the module making the torque request enters a defaulted operational state. Such a deactivation of cylinders adjusts the torque output of the engine 102 to the driver torque request and eliminates the push that may otherwise be experienced.

Figure 3:
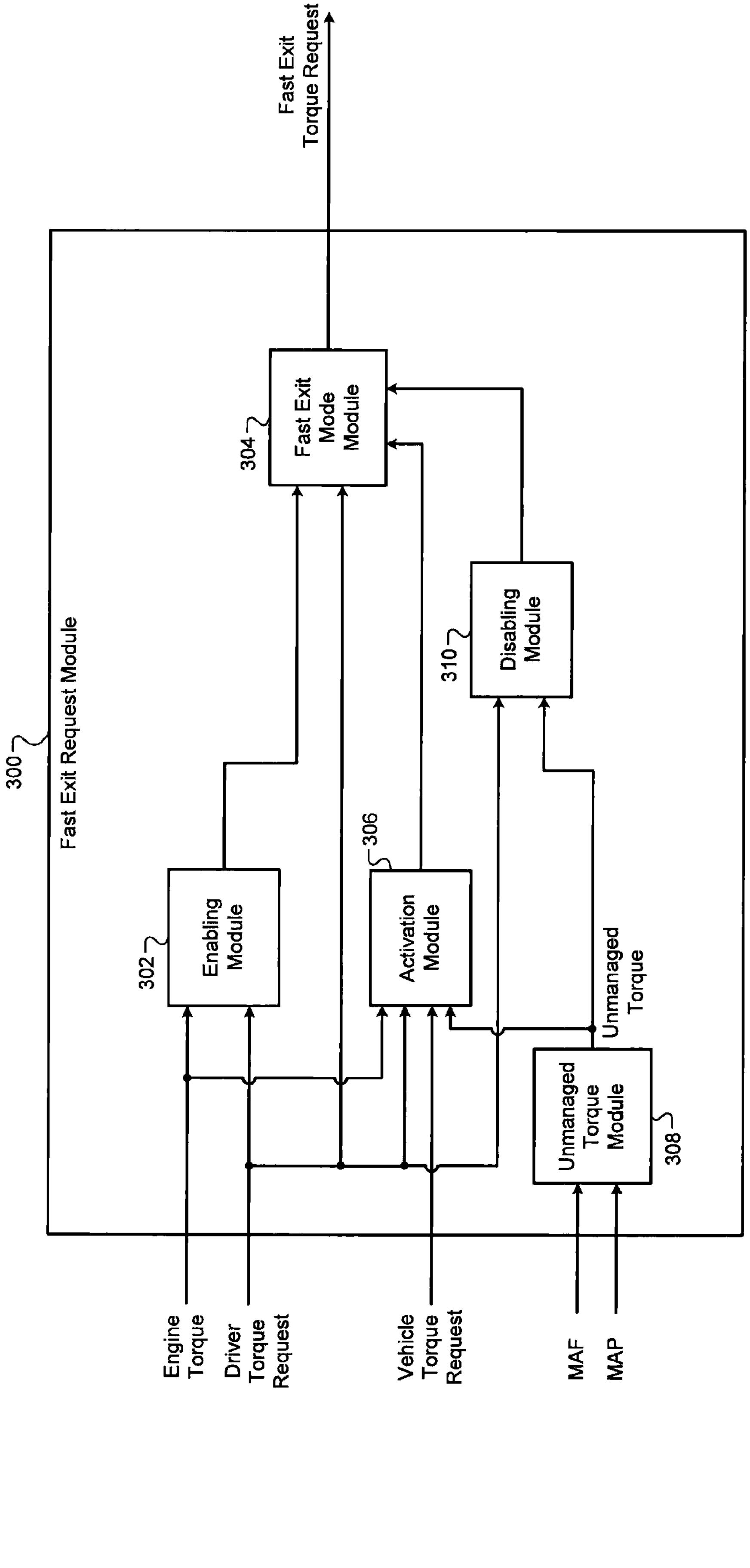
FIG. 3 is a functional block diagram of an exemplary implementation of a fast exit request module according to the principles of the present disclosure.

Referring now to FIG. 3, a functional block diagram of an exemplary implementation of the fast exit request module 300 is presented. The fast exit request module 300 includes an enabling module 302, a fast exit mode module 304, and an activation module 306. The fast exit request module 300 also includes an unmanaged torque module 308 and a disabling module 310.

The enabling module 302 selectively enables the fast exit mode module 304 based on a comparison of the driver torque request and the torque output of the engine 102. More specifically, the enabling module 302 enables the fast exit mode module 304 when the engine torque is greater than the driver torque request. The engine torque may be a commanded torque or a measured torque output of the engine 102. For example only, the commanded torque may be determined based on the predicted and immediate torque requests and/or the commanded actuator positions. The torque output of the engine 102 may be determined based on parameters measured by one or more sensors, such as the engine speed sensor 142 and/or a torque sensor (not shown).

The activation module 306 monitors the vehicle torque request and selectively activates a fast exit mode of the fast exit mode module 304 based on the vehicle torque request and a comparison of unmanaged torque of the engine 102 with the driver torque request. More specifically, the activation module 306 activates the fast exit mode when the magnitude of the difference between the unmanaged torque and the driver torque request is greater than a predetermined maximum torque ($T_{MAX}$) and at least one fast exit mode condition occurs. $T_{MAX}$ may be calibratable and may be set, for example, to approximately 75 Nm or less.

The unmanaged torque module 308 determines the unmanaged torque of the engine 102. The unmanaged torque is the amount of torque that the engine 102 is capable of producing with the current air per cylinder (APC) and spark advance as calibrated (e.g., MBT). The unmanaged torque may also be referred to as an estimated torque. For example only, the unmanaged torque module 308 may determine the unmanaged torque based on the MAP and/or the MAF.

A fast exit mode condition may occur when the vehicle torque request is aborted. For example only, a decrease in accelerator pedal position may cause a torque request for a gear shift to be aborted. A fast exit mode condition also occurs when the conditions that spurred the making of the vehicle torque request are no longer occurring. For example only, a torque request may be to eliminate dragging of a wheel of the vehicle. The torque request may be aborted if the wheel drag stops and the wheel begins rolling. Additionally, a fast exit mode condition occurs when the enabling conditions are no longer satisfied (e.g., when the engine torque is less than the driver torque request).

A fast exit mode condition also occurs when a fault or error condition has occurred. For example only, the requesting module, a vehicle sensor, and/or another module may be diagnosed as faulty. A fast exit mode condition also occurs when the requesting module has entered a predetermined state of operation. For example only, the driver may request the transmission control module 132 enter a manual shifting mode. Additionally, a fast mode exit condition occurs when the vehicle torque request is limited. Modules, such as the ECM 110, may limit the vehicle torque request, for example, to limit acceleration.

When the fast exit mode is activated, the fast exit mode module 304 outputs a fast exit torque request to the immediate torque control module 208. The immediate torque control module 208 determines an appropriate number of cylinders to deactivate and deactivates that number of cylinders. For example only, the immediate torque control module 208 may eliminate provision of fuel and/or spark to deactivate the appropriate number of cylinders. In this manner, the fast exit mode module 304 reduces the torque output of the engine 102 (i.e., limits the engine torque output) to the driver torque request when the fast exit mode is activated.

The number of cylinders to be deactivated may be determined based on the driver torque request. For example only, the number of cylinders to deactivate may be determined based on a difference between the total number of cylinders of the engine 102 and the number of cylinders necessary to meet the driver torque request.

The disabling module 310 selectively disables the fast exit mode module 304 and, therefore, the fast exit mode. The disabling module 310 disables the fast exit mode module 304 based on a comparison of the unmanaged torque with the driver requested torque. More specifically, the disabling module 310 disables the fast exit mode module 304 when the difference between the unmanaged torque and the driver requested torque is less than a predetermined minimum torque ($T_{MIN}$). $T_{MIN}$ may be calibratable and may be set, for example, between approximately 10.0 Nm and approximately 40.0 Nm.

When the fast exit mode module 304 is disabled, the previously deactivated cylinders are reactivated. Normal control of the torque output of the engine 102 is then resumed. In this manner, the fast exit mode module 304 relinquishes control of the torque production of the engine 102 when the unmanaged torque reaches a desired level.

Figure 4:
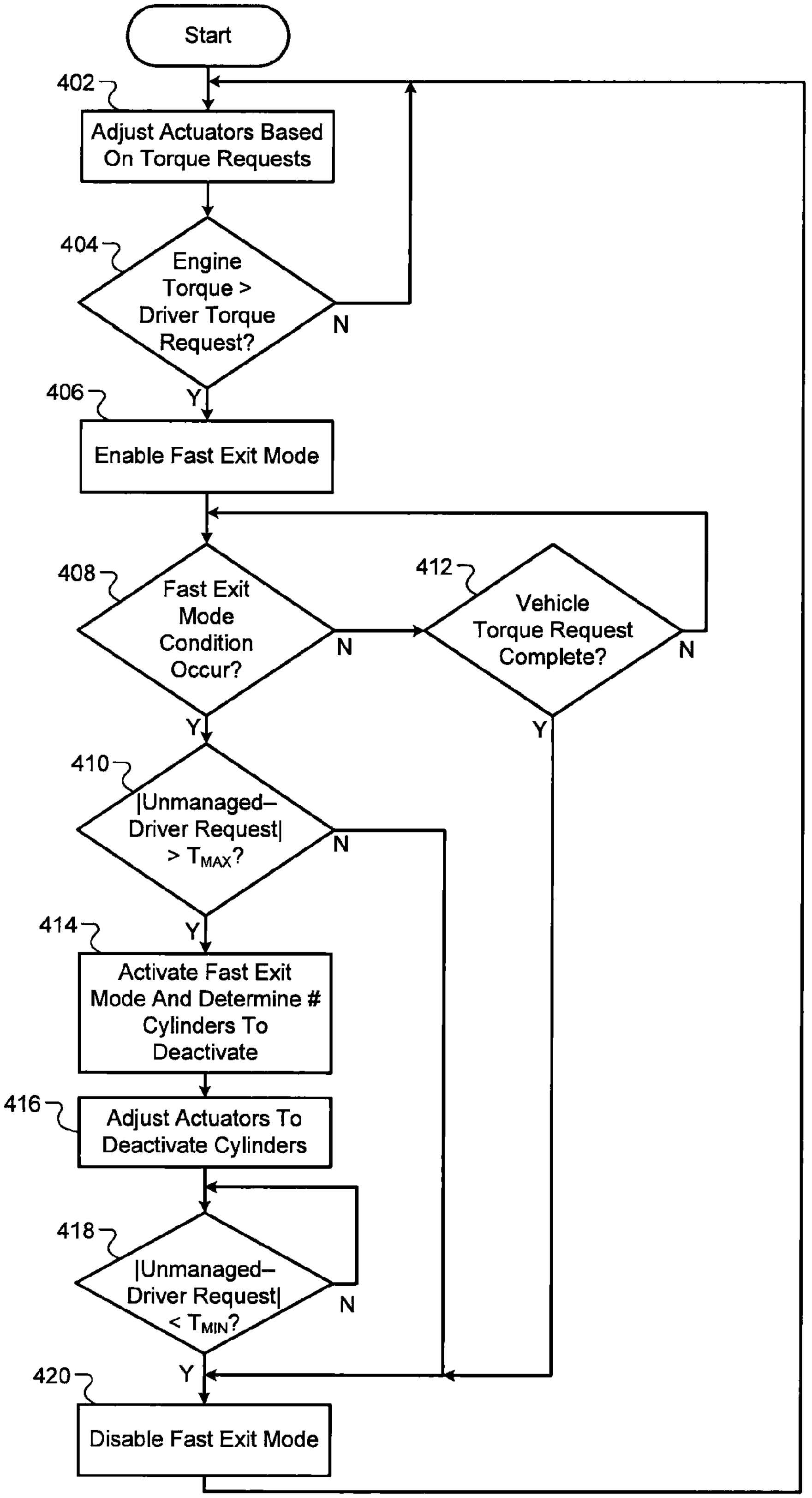
FIG. 4 is a functional block diagram of a flowchart depicting exemplary steps performed by the fast exit request module according to the principles of the present disclosure.

Referring now to FIG. 4, a flowchart depicting exemplary steps performed by the fast exit request module 300 is presented. Control begins in step 402 where control adjusts the actuators based on the torque requests. The torque requests include the driver torque request and the vehicle torque request. In step 404, control determines whether the engine torque is greater than the driver torque request. If true, control continues in step 406; otherwise, control returns to step 402. For example only, the engine torque may include the commanded torque or the torque output of the engine 102.

In step 406, control enables the fast exit mode. Control continues in step 408 where control determines whether at least one fast exit mode condition has occurred. If true, control continues to step 410; otherwise, control transfers to step 412. For example only, a fast exit mode condition may occur when the vehicle torque request is aborted, when the conditions that spurred the making of the torque request are no longer occurring, and/or when the enabling conditions are no longer satisfied. Additionally, a fast exit mode condition may occur when a fault or error condition has occurred, the requesting module has entered a predetermined state of operation, and/or when the vehicle torque request is limited.

In step 412 (i.e., when a fast exit mode condition has not occurred), control determines whether the vehicle torque request is complete. If true, control transfers to step 420; otherwise, control returns to step 408. Step 420 is discussed further below. In other implementations, control may alternatively return to step 402 when step 412 is true.

In step 410 (i.e., when at least one fast exit mode condition has occurred), control determines whether the difference between the unmanaged torque and the driver torque request is greater than the maximum torque value, $T_{MAX}$. If true, control continues to step 414; otherwise, control transfers to step 420. $T_{MAX}$ may be calibratable and may be set to, for example, approximately 75.0 Nm or less. For example only, the unmanaged torque may be determined based on the MAF and/or the MAP.

Control continues in step 414 where control activates the fast exit mode and determines the appropriate number of cylinders to deactivate. For example only, control may determine the number of cylinders to deactivate based on the driver torque request. Control adjusts actuators to deactivate the determined number of cylinders in step 416. More specifically, control deactivates the cylinders by adjusting the fast actuators, such as the spark actuator module 118 and/or the fuel actuator 116. For example, control may deactivate the cylinders by disabling provision of fuel and/or spark to those cylinders.

In step 418, control determines whether the difference between the unmanaged torque and the driver requested torque is less than the predetermined minimum torque, $T_{MIN}$. If true, control continues to step 420; otherwise, control remains in step 418. $T_{MIN}$ may be calibratable and may be set to, for example, between approximately 10.0 Nm and approximately 40.0 Nm. In step 420, control disables the fast exit mode, and control returns to step 402. In this manner, the cylinders are deactivated until the unmanaged torque reaches a desired level, thereby preventing the push.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system of a vehicle, comprising:

an immediate torque control module that selectively adjusts torque output by an engine based on a vehicle torque request that is greater than a driver torque request; and a fast exit mode module that selectively deactivates a cylinder of said engine when a difference between an estimated maximum torque output of said engine and said driver torque request is greater than a predetermined maximum torque.

2. The engine control system of claim 1 further comprising a requesting module that selectively generates said vehicle torque request, wherein said fast exit mode module deactivates said cylinder when said requesting module aborts said vehicle torque request while said estimated maximum torque output is greater than said driver torque request.

3. The engine control system of claim 1 further comprising a requesting module that selectively generates said vehicle torque request when a predetermined event occurs, wherein said fast exit mode module deactivates said cylinder when said predetermined event stops occurring while said estimated maximum torque output is greater than said driver torque request.

4. The engine control system of claim 3 wherein said predetermined event is wheel drag.

5. The engine control system of claim 1 wherein said fast exit mode module deactivates said cylinder when a fault is diagnosed in at least one of a sensor and a module of said vehicle while said estimated maximum torque output is greater than said driver torque request.

6. The engine control system of claim 1 further comprising a requesting module that operates in one of a first mode of operation and a predetermined mode of operation, wherein said fast exit mode module deactivates said cylinder when said requesting module enters said predetermined mode of operation while said estimated maximum torque output is greater than said driver torque request.

7. The engine control system of claim 6 wherein said predetermined mode of operation is a manual shift mode.

8. The engine control system of claim 1 wherein said fast exit mode module deactivates said cylinder when said vehicle torque request is limited while said estimated maximum torque output is greater than said driver torque request.

9. The engine control system of claim 1 wherein said fast exit mode module outputs a fast exit torque request when said difference is greater than said predetermined maximum torque, and wherein said immediate torque control module deactivates said cylinder when said fast exit torque request is output.

10. The engine control system of claim 9 wherein said immediate torque control module disables at least one of spark and fuel to said cylinder when said fast exit torque request is output.

11. The engine control system of claim 9 wherein said immediate torque control module determines a number of cylinders for deactivation based on said driver torque request when said fast exit torque request is output and deactivates said number of cylinders.

12. The engine control system of claim 9 wherein said immediate torque control module limits said torque output of said engine based on said driver torque request.

13. The engine control system of claim 1 further comprising a disabling module that disables said fast exit mode module when said difference between said estimated maximum torque output and said driver torque request is less than a predetermined minimum torque.

14. An engine control method comprising:

selectively adjusting torque output by an engine based on a vehicle torque request that is greater than a driver torque request; and selectively deactivating a cylinder of said engine when a difference between an estimated maximum torque output of said engine and said driver torque request is greater than a predetermined maximum torque.

15. The engine control method of claim 14 further comprising deactivating said cylinder when a requesting module aborts said vehicle torque request while said estimated maximum torque output is greater than said driver torque request.

16. The engine control method of claim 14 further comprising:

selectively generating said vehicle torque request when a predetermined event occurs; and deactivating said cylinder when said predetermined event stops occurring while said estimated maximum torque output is greater than said driver torque request.

17. The engine control method of claim 14 wherein said predetermined event is wheel drag.

18. The engine control method of claim 14 further comprising deactivating said cylinder when a fault is diagnosed in at least one of a sensor and a module of said vehicle while said estimated maximum torque output is greater than said driver torque request.

19. The engine control method of claim 14 further comprising deactivating said cylinder when a requesting module enters a predetermined mode of operation from a first mode of operation while said estimated maximum torque output is greater than said driver torque request.

20. The engine control method of claim 19 wherein said predetermined mode of operation is a manual shift mode.

21. The engine control method of claim 14 further comprising deactivating said cylinder when said vehicle torque request is limited while said estimated maximum torque output is greater than said driver torque request.

22. The engine control method of claim 14 further comprising:

outputting a fast exit torque request when said difference is greater than said predetermined maximum torque; and deactivating said cylinder when said fast exit torque request is output.

23. The engine control method of claim 22 further comprising disabling at least one of spark and fuel to said cylinder when said fast exit torque request is output.

24. The engine control method of claim 22 further comprising:

determining a number of cylinders for deactivation based on said driver torque request when said fast exit torque request is output; and deactivating said number of cylinders.

25. The engine control method of claim 22 further comprising limiting said torque output of said engine based on said driver torque request.

26. The engine control method of claim 14 further comprising disabling said deactivating when said difference between said estimated maximum torque output and said driver torque request is less than a predetermined minimum torque.

* * * * *